United States Patent
Masuda et al.

(10) Patent No.: US 9,261,679 B2
(45) Date of Patent: Feb. 16, 2016

(54) IMAGING SYSTEM AND IMAGING OPTICAL SYSTEM

(71) Applicants: Kensuke Masuda, Kanagawa (JP); Noriyuki Terao, Miyagi (JP); Yoshiaki Irino, Kanagawa (JP); Tomonori Tanaka, Kanagawa (JP); Nozomi Imae, Kanagawa (JP); Toru Harada, Kanagawa (JP); Hirokazu Takenaka, Kanagawa (JP); Hideaki Yamamoto, Kanagawa (JP); Satoshi Sawaguchi, Kanagawa (JP); Hiroyuki Satoh, Kanagawa (JP)

(72) Inventors: Kensuke Masuda, Kanagawa (JP); Noriyuki Terao, Miyagi (JP); Yoshiaki Irino, Kanagawa (JP); Tomonori Tanaka, Kanagawa (JP); Nozomi Imae, Kanagawa (JP); Toru Harada, Kanagawa (JP); Hirokazu Takenaka, Kanagawa (JP); Hideaki Yamamoto, Kanagawa (JP); Satoshi Sawaguchi, Kanagawa (JP); Hiroyuki Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/503,052

(22) Filed: Sep. 30, 2014

(65) Prior Publication Data
US 2015/0015664 A1    Jan. 15, 2015

Related U.S. Application Data

(63) Continuation of application No. 13/590,365, filed on Aug. 21, 2012.

(30) Foreign Application Priority Data

Aug. 26, 2011  (JP) .................................. 2011-185217

(51) Int. Cl.
*G02B 13/06* (2006.01)
*H04N 5/232* (2006.01)
(Continued)

(52) U.S. Cl.
CPC .............. *G02B 13/06* (2013.01); *H04N 5/2258* (2013.01); *H04N 5/23238* (2013.01); *G02B 5/04* (2013.01); *H04N 5/2254* (2013.01)

(58) Field of Classification Search
CPC .......................... G02B 13/0065; G06B 13/006
USPC ............ 348/335, 36; 359/725, 733, 641, 642, 359/643, 740, 662, 672, 676, 353, 354, 380, 359/420–422, 432, 802; 353/6, 7
See application file for complete search history.

(56) References Cited

U.S. PATENT DOCUMENTS 3,283,653 A      11/1966  Tokarzewski
7,154,551 B2 *   12/2006  Kuriyama ............ H04N 5/2254
                                                        348/335

(Continued)

FOREIGN PATENT DOCUMENTS

JP    2006-098942    4/2006
JP    2007-164079    6/2007

(Continued)

OTHER PUBLICATIONS

Extended European Search Report issued Dec. 20, 2012 in Patent Application No. 12181570.8.

(Continued)

*Primary Examiner* — Jefferey Harold
*Assistant Examiner* — Omer Khalid
(74) *Attorney, Agent, or Firm* — Oblon, McClelland, Maier & Neustadt, L.L.P.

(57) ABSTRACT

An optical system includes a central portion having a magnification per unit angle of view which increases from a center to an outside at an increase rate and a circumferential portion being outside the central portion and having a magnification per unit of view which increases from the central portion to an outside at an increase rate smaller than the increase rate of the central portion.

11 Claims, 9 Drawing Sheets

(51) Int. Cl.
   *H04N 5/225*   (2006.01)
   *G02B 5/04*    (2006.01)

(56) References Cited

U.S. PATENT DOCUMENTS

| | | | |
|---|---|---|---|
| 7,612,946 B2 * | 11/2009 | Kweon, II | G02B 13/06 359/648 |
| 2005/0088762 A1 | 4/2005 | Ohashi | |
| 2007/0139793 A1 * | 6/2007 | Kawada | G02B 13/06 359/740 |
| 2010/0007967 A1 * | 1/2010 | Ohashi | G02B 15/28 359/684 |
| 2010/0091393 A1 | 4/2010 | Togino | |
| 2010/0254025 A1 | 10/2010 | Yoshida et al. | |

FOREIGN PATENT DOCUMENTS

| | | |
|---|---|---|
| JP | 2010-243711 | 10/2010 |
| WO | WO 2008/129552 A1 | 10/2008 |

OTHER PUBLICATIONS

Jean-Loup Bezy et al., "Medium Resolution Imaging Spectrometer (MERIS)", Proceedings of SPIE, XP-055046724, Jan. 27, 1997, pp. 31-41.

U.S. Office Action mailed Mar. 5, 2015 for U.S. Appl. No. 13/590,365.

* cited by examiner

IMAGING SYSTEM AND IMAGING OPTICAL SYSTEM

CROSS-REFERENCE TO RELATED APPLICATION

The present application is a continuation application of U.S. patent application Ser. No. 13/590,365, filed at the U.S. Patent and Trademark Office on Aug. 21, 2012, which is based on and claims priority from Japanese Patent Application No. 2011-185217, filed on Aug. 26, 2011, the disclosures of each of which are hereby incorporated by reference in their entirety.

BACKGROUND

1. Field of the Invention

The present invention relates to an imaging system and an imaging optical system for use in the imaging system.

2. Description of the Related Art

As an imaging system which images all directions at one time, an imaging system having a plurality of wide-angle lenses is known. Unlike an imaging lens for normal plane photographing, a wide-angle lens for use in such an imaging system often includes different magnification between the center thereof and the edge portion thereof.

As such, it is necessary to increase the imaging magnification in the edge portion of the lens so as to be higher than that in the center of the lens in order to compensate image quality deterioration in the edge portion of the lens in which the imaging performance thereof is likely to be deteriorated, compared to that in the center portion of the lens in the case of a constitution of a small imaging system having an equal image quality over all directions by a known wide-angle lens. In addition, in the imaging system, all directions are referred to as omnidirectional.

It is known that a lens system having a large magnification in the edge portion thereof compared to that in the center portion thereof, namely, a lens system in which the magnification per unit angle of view monotonically increases, has a short entire length. However, the thickness of the lens constituting the lens system is reduced, resulting in a deterioration in lens performance.

On the other hand, when considering the performance of a lens, the magnification in the edge portion thereof is likely to decrease compared to that in the center portion thereof. As such, the entire length of the lens system is likely to increase by increasing the imaging magnification in the edge portion compared to that in the center portion.

Japanese Patent Application Publication No. 2006-098942 describes that the magnification can be increased in an edge portion of an image by changing a projection method of a fisheye lens as a wide-angle lens to a stereoscopic projection method.

SUMMARY

It is, therefore, an object of the present invention to provide a new imaging system capable of imaging an image having a uniform quality over the entire imaging range, and an imaging optical system for use in such an imaging system.

According to one embodiment of the present invention, an optical system comprises a central portion having a magnification per unit angle of view which increases from a center to an outside at an increase rate, and a circumferential portion being outside the central portion and having a magnification per unit of view which increases from the central portion to an outside at an increase rate smaller than the increase rate of the central portion.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DESCRIPTION OF THE PREFERRED EMBODIMENTS

Hereinafter, embodiments will be described.

Figure 9:
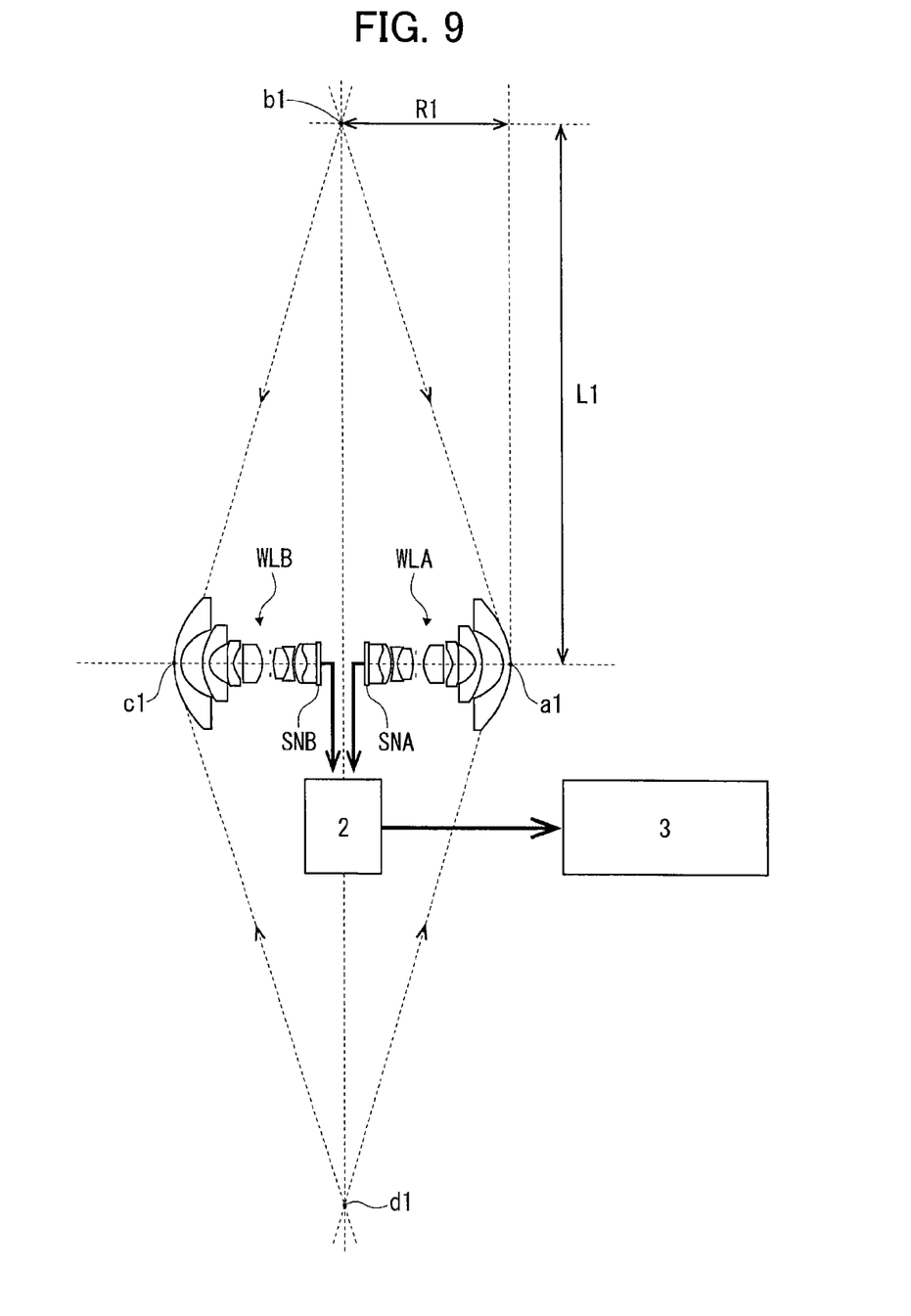
FIG. 9 is a view illustrating one embodiment of an omnidirectional imaging system.

FIG. 9 is a view illustrating one embodiment of an omnidirectional imaging system using two wide-angle lenses.

In this embodiment, two wide-angle lenses WLA, WLB as two imaging optical systems are combined so as to image omnidirectional information. The wide-angle lenses WLA, WLB have the same specifications, and are combined so as to be opposite to each other such that the respective optical axes are aligned.

The image imaged by the wide-angle lens WLA is imaged on a light-receiving surface of a two-dimensional imaging element SNA and the image imaged by the wide-angle lens WLB is imaged on a light-receiving surface of a two-dimensional imaging element SNB. These imaging elements SNA, SNB convert the received light distributions into image signals, and input the image signals to an image processor 2.

The image processor 2 synthesizes the image signals from the imaging elements SNA, SNB into one image to obtain a solid angle of a $4\pi$ radian image (hereinafter, referred to as an omnidirectional image), and outputs the image to an output device 3 such as a display or a printer. The output device outputs the omnidirectional image.

In the wide-angle lenses WLA, WLB, n=2, and the wide-angle lenses WLA, WLB have an angle of view A (degree) over 180 (=360/2) degrees.

The wide-angle lenses WLA, WLB are configured such that the magnification per unit angle of view monotonically increases from 0 to 180-degree angle of view (=360/2), and the increase rate of the magnification monotonically decreases from 180-degree angle of view to an A-degree full angle of view. In addition, the full angle of view is an angle of view twice the after-described half angle of view dθ in FIG. 8.

The technical meaning of the feature of the change in the magnification per unit angle of view will be described.

Minimal light receiving areas are two-dimensionally arranged on light-receiving surfaces of two-dimensional imaging elements such as the imaging elements SNA, SAB in equal high density. The information photoelectrically converted in each of the light-receiving areas constitutes the pixel information of the image information.

The wide-angle lenses WLA, WLB and the imaging elements SNA, SNB have a positional relationship such that the optical axes of the wide angle lenses are located to be orthogonal to the central portions of the light-receiving areas of the imaging elements, and the light-receiving areas of the imaging elements become the imaging faces of the wide-angle lenses.

In general, spatial resolution (MTF) is lowered and brightness of an image is decreased in accordance with an increase in a distance from the optical axis on the imaging surface.

The lowering in the spatial resolution (MTF) and the decrease in the brightness of an image in accordance with an increase in a distance from the optical axis on the imaging surface indicate the decrease in the image information to be applied to the same size light-receiving areas toward the peripheral portion of the light-receiving area.

In order to compensate such decrease in the image information, the imaging magnification is increased toward the peripheral portion of the light-receiving area. Namely, the area on the light-receiving surface, which receives constant image information, is increased in accordance with an increase in a distance from the optical axis of the wide-angle lens by the increase in the imaging magnification in the peripheral portion. Therefore, the number of pixels which receives the constant image information is increased, and the decrease in the image information can be compensated.

The imaging optical systems (wide-angle lenses WLA, WLB) for use in the omnidirectional imaging system illustrated in FIG. 9 are configured such that the magnification per unit angle of view monotonically increases from 0 (optical axis) to 180-degree angle of view in full angle of view A over 180 degrees and the increase rate of the magnification monotonically decreases from 180-degree angle of view to full angle of view A.

Namely, from 180 degrees to full angle of view A, the magnification per unit angle of view smoothly increases to obtain an increase rate lower that that from 0 to 180 degrees, is constant magnification which maintains the magnification per unit angle of view in 180 degrees, or monotonically decreases.

In the following description, for the purpose of specifying the description, the magnification per unit angle of view from 180-degree angle of view to A-degree full angle of view is constant magnification which substantially maintains the magnification per unit angle of view in 180 degrees.

If the wide-angle lenses WLA, WLB are individually used, it is preferable for the magnification per unit angle of view to monotonically increase toward A-degree full angle of view in the full angle of view area from 0 to A-degree full angle of view.

The wide-angle lenses WLA, WLB are combined as illustrated in FIG. 9.

In FIG. 9, reference number a1 denotes an apex of the most object side lens surface of the wide-angle lens WLA, and reference number c1 denotes an apex of the most object side lens surface of the wide-angle lens WLB.

The incident light beams entering in the wide-angle lenses WLA, WLB at the maximum angle of view cross at the points b1, d1 illustrated in FIG. 9. The distance from each of the apexes a1, c1 of the object side lenses of the wide-angle lenses WLA, WLB and each of the plans passing through the points b1, d1 is a distance R1 illustrated in FIG. 9.

Moreover, the distance from the straight line connecting the lens apexes a1, c1 (optical axis of the wide-angle lenses WLA, WLB) to each of the points b1, d1 is a distance L1 illustrated in FIG. 9.

The maximum angle of view light beam entering in the wide-angle lens WLA is a conical shape with the apex a1 of the object side lens as an apex, and the maximum angle of view light beam entering in the wide-angle lens WLB is a conical shape with the apex c1 of the objet side lens as an apex in FIG. 9.

The space surrounded by the two conical surfaces in which the two conical surfaces (bottom radius: L1, height: R1) are combined with the common lens optical axis (the inside of the space obtained by rotating the parallelogram connecting the points a1, b1, c1, d1 in FIG. 9 about the straight line connecting the points a1, c1) is a non-imaging space region.

The incident light beams entering in the portions of the wide-angle lens WLA, WLB over 180-degree angle of view cross to each other in the plane including the points b1, d1. The light beams entering at angle of view A cross on the circumferences of circles with the points b1, d1 as a diameter.

Accordingly, the light beams from 180-degree angle of view to full angle of view A of the imaging light beams of the wide-angle lenses WLA, WLB image on both of the imaging elements SNA, SAB.

Namely, an image portion (IA) of the image by the wide-angle lens WLA on the imaging element SNA, on which the light beam from 180 to A-degree is imaged and an image portion (IB) of the image by the wide-angle lens WLB on the imaging element SNB, on which the light beam from 180 to A-degree is imaged are the same images.

With this constitution, twice the information can be obtained relative to the same image portions by using the image portions IA, IB in the case of forming an omnidirectional image by synthesizing the image signals from the imaging elements SNA, SNB because the image portion IA by the imaging element SNA and the imaging portion IB by the imaging element SNB are the same.

More specifically, by using the two wide-angle lenses and imaging elements, a result similar to that by the increase in the light-receiving area can be obtained relative to an image in an area of angle of view over 180 degrees. This is the same as the increase in magnification per unit angle of view.

For this reason, even if the magnification per unit angle of view in the wide-angle lenses WLA, WLB is approximately constant without monotonically increasing in the portions over 180-degree angle of view, twice the information in these portions can be used. Thus, an image which is comparable to an image having 0 to 180-degree angle of view can be obtained.

Namely, by lowering the increase rate of the magnification per unit angle of view only in the peripheral portion of the lenses in which the images of the wide-angle lenses WLA, WLB are overlapped, an unnecessary increase in the entire length of the lens can be prevented while ensuring a required thickness for the lens processing.

In the above description, the magnification per unit angle of view in the wide-angle lenses WLA, WLB is approximately constant for a portion over 180 degrees. However, the magnification per unit angle of view is not limited to be constant. Even if the magnification per unit angle of view slowly increases or monotonically decreases in the area of angle of view over 180 degrees, the sufficient amount of information can be guaranteed because both of the information of the image portions IA, IB can be used. Consequently, a celestial sphere image having an equal quality over all directions can be obtained.

Since the image portions IA, IB are the same images, these image portions can be a reference for jointing the images as reference data illustrating the same image when forming an omnidirectional image by synthesizing image signals output from the imaging elements SAN, SNB.

In the above description, the magnification per unit angle of view of the wide-angle lenses WLA, WLB is described, but the above features of the wide-angle lenses WLA, WLB can be specified based on the relationship between an image height and an angle of view.

The differential of the image height Y by the angle of view $\theta$, $dY/d\theta$ is a ratio of the change in the image height per unit angle of view, and corresponds to the change in the magnification per unit angle of view.

If the angle of view increases so as to be larger than 180 degrees, the increase rate of the magnification per unit angle of view monotonically decreases, and the magnification slowly increases or is constant, or monotonically decreases, the differential $dY/d\theta$ drastically decreases.

It is preferable for the differential $dY/d\theta$ to satisfy the following condition (1).

$$43.3 \geq dY/d\theta \geq 0.007 \text{ [mm/deg]} \quad (1)$$

If the differential $dY/d\theta$ drastically deceased in a region where the angle of view increases so as to be larger than 180 degrees and the increase rate of the magnification per unit angle of view monotonically decreases lowers the lower limit value of 0.007 mm/deg, the image portions IA, IB become excessively compressed images, and become insufficient as reference data for use in the synthesizing of the images.

The upper limit is based on the size of the light-receiving surface of the imaging element. The maximum size of the light-receiving surface of the commercial imaging element is 35 mm when at a full size. If the differential exceeds the upper limit value of 43.3, an imaging element having an appropriate light-receiving surface size cannot be obtained.

Since the upper limit of the condition (1) is controlled by the light-receiving surface size of the imaging element as described above, the upper limit value of the condition (1) can be set to be larger if an imaging element having a larger size light-receiving surface is achieved in the future.

The above-described embodiment is applied to a general case.

An imaging system can be constituted by combining n or more photographing optical systems including an imaging optical system having a full angle of view A (degree) larger than 360/n where n is a natural number of 2 or more, in which the magnification per unit angle of view monotonically increase from 0 to 360/n (degree), and the increase rate of the angle of view monotonically deceases from 360/n (degree) to the full angle of view A (degree) and a two-dimensional imaging element which converts light condensed by the imaging optical system into image signals.

It is preferable for the differential of the image height Y of the imaging optical system by the angle of view $\theta$ $dY/d\theta$ to satisfy the following condition (1).

$$43.3 \geq dY/d\theta \geq 0.007 \text{ [mm/deg]} \quad (1)$$

For example, three wide-angle lenses (imaging optical system) having an angle of view A (for example, 140 degrees) larger than 360/3=120 degrees are radially arranged in the same plane, and imaging elements are combined with the wide-angle lenses, respectively, to constitute the imaging system, so that a 360-degree horizontal panoramic image can be imaged.

Although the obtained image is not an omnidirectional image, the imaging system which can image such a horizontal panoramic image can be preferably used as a car-mounted camera or a security camera.

If four wide-angle lenses having 140-degree angle of view are spatially and radially arranged, and are combined into a regular tetrahedron to obtain an omnidirectional imaging system, a solid angle of $2\pi$ radian omnidirectional image can be imaged.

For example, four wide-angle lenses having an angle of view A (100 degrees) larger than 360/4=90 degrees are radially arranged in the same plane, and imaging elements are combined with the wide-angle lenses, respectively, to constitute the imaging system, so that a 360-degree horizontal panoramic image can be obtained. Eight photographing optical systems made of the combination of such wide-angle lenses and imaging elements are radially arranged in a space, and are combined into a rectangular octahedron to obtain an omnidirectional imaging system, so that a solid angle of a $2\pi$ radian omnidirectional image can be imaged.

Figure 10:
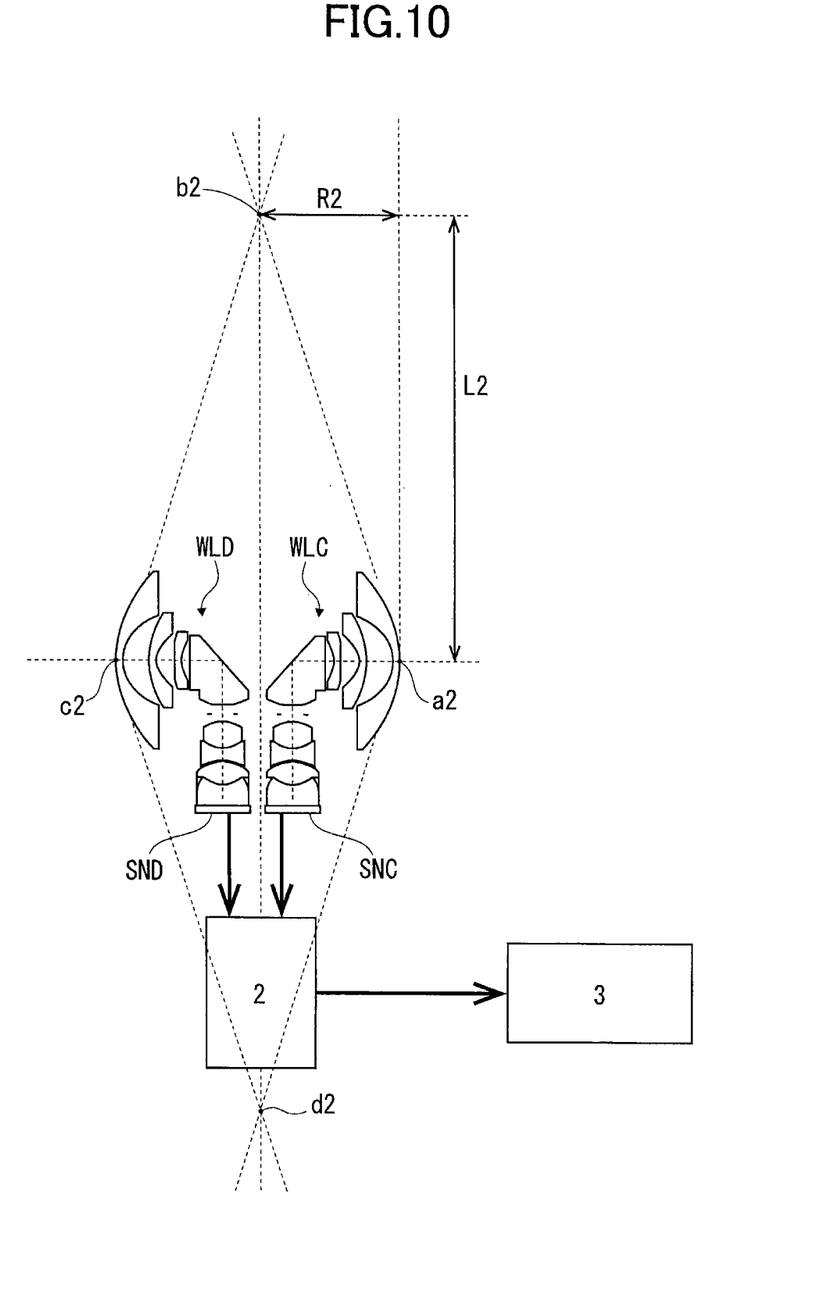
FIG. 10 is a view illustrating another embodiment of an omnidirectional imaging system.

FIG. 10 is a view illustrating another embodiment of an omnidirectional imaging system.

In this example, two wide-angle lenses WLC, WLD are combined to image omnidirectional information as two imaging optical systems. The wide-angle lenses WLC, WLD are the same, and are combined so as to be opposite to each other such that the optical axes thereof are aligned.

An image imaged by the wide-angle lens WLC images on a light-receiving surface of a two-dimensional imaging element SNC, and the image imaged by the wide-angle lens WLD is imaged on a light-receiving surface of a two-dimensional imaging element SND. These imaging elements SNC, SND convert the received light distribution into image signals, and input the image signals to an image processor 2.

The image processor 2 synthesizes the image signals from the imaging elements SNC, SND into one image to obtain a solid angle of $4\pi$ radian omnidirectional image, and outputs the image to an output device 3 such as a display or a printer. The output device outputs an omnidirectional image.

The wide-angle lenses WLC, WLD are the same as the above-described wide-angle lenses WLA, WLB in terms of the optical performance, and include angle of view A over 180 (=360/2) degrees.

Moreover, the magnification per unit angle of view monotonically increases from 0 to 180-degree angle of view, and the increase rate of the magnification monotonically decreases from 180-degree angle of view to full angle of view A. A differential of an image height Y by an angle of view $\theta$, $dY/d\theta$ satisfies the condition (1).

In FIG. 10, reference number a2 denotes an apex of the most object side lens surface of the wide-angle lens WLC and reference number c2 denotes an apex of the most object side lens surface of the wide-angle lens WLD.

The incident light beams entering in the wide-angle lenses WLC, WLD cross at points b2, d2 illustrated in FIG. 10. The distance from each of the apexes a2, c2 of the most object side lenses of the wide-angle lenses WLC, WLD to each of the planes passing through the points b2, d2 is R2 illustrated in FIG. 10.

Moreover, the distance from the straight line connecting the apexes of the lenses a2, c2 (object side optical axis of wide-angle lenses WLC, WLD) to each of the points b2, d2 is L2 illustrated in FIG. 10.

The maximum angle of view light beams entering in the wide-angle lens WLC are a conical shape with the apex a2 of the object side lens as an apex, and the maximum angle of view light beams entering in the wide-angle lens WLD are a conical shape with the apex c2 of the object side lens as an apex.

The inside of the space obtained by rotating the parallelogram connecting the points a2, b2, c2, d2 in which the two conical surfaces (bottom radius L2 and height R2) are combined with a common object side optical axis about the straight light connecting the points a2, c2 is an non-imaging space region.

According to the comparison of the embodiment illustrated in FIG. 10 with the embodiment illustrated in FIG. 9, L2<L1 and R2<R1 are obtained. The non-imaging space region in the embodiment illustrated in FIG. 10 is smaller than that in FIG. 9.

Namely, an omnidirectional image to a further close region can be imaged with the omnidirectional imaging system in FIG. 10, compared to that in FIG. 9.

Such an image can be obtained by the following constitutions. In the omnidirectional imaging system in FIG. 10, each of the wide-angle lenses WLC, WLD as imaging optical systems includes an object side first lens group having a negative refractive power and an image side second lens group having a positive refractive power. The first lens group includes a reflection member which bends the optical path toward the second lens group. By the 90-degree bending of the optical path in the lens, the distance (2R2) between the apex a2 of the most object side lens surface of the first lens group of the wide-angle lens WLC and the apex c2 of the most object side lens surface of the first lens group of the wide-angle lens WLD is reduced shorter than 2R1 in FIG. 9.

As described above, each of the wide-angle lenses WLC, WLD as the imaging optical system of the photographing optical system includes the negative first lens group arranged on the object side and the positive second lens group arranged on the image side, and the first lens group includes the reflection member which curves the optical path toward the second lens group. With this constitution, the imaging portion of the omnidirectional imaging system can be downsized, and an omnidirectional image to the further close region can be obtained.

Hereinafter, a detailed embodiment will be described.

Figure 1:
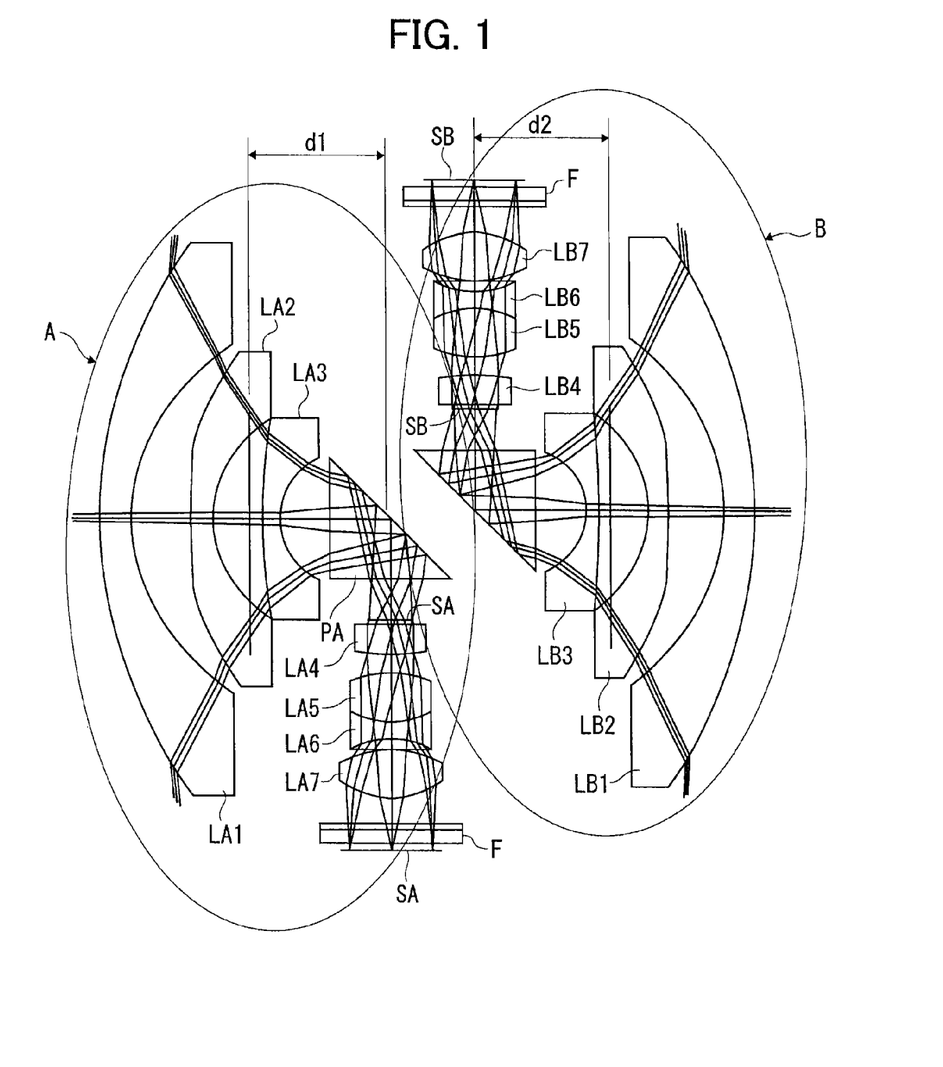
FIG. 1 is a view illustrating one embodiment in which two photographing optical systems are combined in an omnidirectional imaging system.

FIG. 1 is a view schematically illustrating a main portion of an omnidirectional imaging system according to another embodiment of the present invention.

In FIG. 1, the portions illustrated by reference numbers A, B are photographing optical systems, respectively.

Each of the two photographing optical systems A, B includes a wide-angle lens (imaging optical system) having an angle of view wider than 180 degrees and an imaging sensor which images by the wide-angle lens. The imaging sensor is a two-dimensional imaging element.

The wide-angle lens of the photographing optical system A includes a front group having lenses LA1-LA3, a right-angle prism PA as a reflection member and a back group having lenses LA4-LA7. An aperture stop SA is disposed on the object side of the lens LA4.

The wide-angle lens of the imaging optical system B includes a front group having lenses LB1-LB3, a right-angle prism PB as a reflection member and a back group having lenses LB4-LB7. An aperture stop SB is disposed on the object side of the lens LB4.

In each of the wide-angle lenses, the front group and the right-angle prism constitute a first lens group and the back group constitutes a second lens group.

Hereinafter, the front group, right-angle prism and back group are used as technical terms.

The lenses LA1-LA3 constituting the front group in the wide-angle lens of the photographing optical system A includes, in order from the object side, a negative meniscus lens (LA1) made of a glass material, a negative lens (LA2) made of a plastic material, and a negative meniscus lens (LA3) made of a glass material.

The lenses LA4-LA7 constituting the back group includes, in order from the object side, a biconvex lens (LA4) made of a glass material, a cemented lens of a biconvex lens (LA5) and a biconcave lens (LA6) made of a glass material and a biconvex lens (LA7) made of a plastic material.

The lenses LB1-LB3 constituting the front group in the wide-angle lens of the imaging optical system B includes, in order from the object side, a negative meniscus lens (LB1) made of a glass material, a negative lens (LB2) made of a plastic material and a negative meniscus lens (LB3) made of a glass material.

The lenses LB4-LB7 constituting the back group includes, in order from the object side, a biconvex lens made of a glass material, a cemented lens of a biconvex lens (LB5) and a biconcave lens (LB6) made of a glass material, and a biconvex lens (LB7) made of a plastic material.

The negative lenses LA2, LB2 of the front group made of a plastic material and the biconvex lenses LA7, LB7 of the back group made of a plastic material in the photographing optical systems A, B have an aspheric surface on both surfaces thereof. The other lenses made of a glass material are spherical lenses, respectively.

A front principle point in each wide-angle lens is set between the second lens LA2, LB2 and the third lens LA3, LB3.

The distance between the intersection of the reflection surface and the optical axis of the front group and the principle point in the wide-angle lens of the photographing optical system A is d1, and the distance between the intersection of the reflection surface and the optical axis of the front group and the front principle point in the wide-angle lens of the photographing optical system B is d2 in FIG. 1.

Where these distances d1, d2 are d, d and a focal length, f satisfy the following condition (2). By satisfying the following condition (2), the wide-angle lens can be downsized, and the effect of disparity can be lowered.

$$7.0 < d/f < 9.0 \tag{2}$$

It is preferable for the right-angle prisms PA, PB to be made of a material having a refractive index of d-line larger than 1.8. The prisms PA, PB internal-reflect the light from the front group toward the back group, so that the optical path of the imaging light beam passes in the prism. If the material of the prism has a high refractive index as described above, the optical path length in the prism is increased longer than an actual optical length, and the distance which curves the light beam can be increased. Therefore, the optical path length between the front group and the back group in the front group, prism and back group can be increased longer than a mechanical optical path length, so that the wide-angle lens can be downsized.

By disposing the prisms PA, PB near the aperture stops SA, SB, a small prism can be used. Thus, the interval between the wide-angle lenses can be reduced.

The prisms PA, PB are disposed between the front group and the back group. The front group of the wide-angle lens is configured to take a light beam having wide-angle of view larger than 180 degrees and the back group is configured to effectively correct the aberration of the image.

By disposing the prism as described above, the prism can be prevented from being misplaced, and is less subjected to manufacturing tolerance.

Example

Hereinafter, a specific example of the wide-angle lens illustrated in FIG. 1 will be described.

The following example illustrates the wide-angle lens for use in both of the photographing optical systems A, B of the omnidirectional imaging system illustrated in FIG. 1. Namely, the two wide-angle lenses for use in the photographing optical systems A, B are the same, and the distance illustrated in the figure is d1=d2.

The distance d1 is a distance on the optical axis between the incident pupil and the reflection surface of the prism PA in the wide-angle lens of the imaging optical system A and the distance d2 is a distance on the optical axis between the incident pupil and the reflection surface of the prism PB in the wide-angle lens of the imaging optical system B.

In the following example, f denotes a focal length of an entire system, No denotes F-number and ω denotes angle of view.

The surface numbers are sequentially 1 to 23 from the object side, and denote lens surfaces, incident and exit surfaces and reflection surface of a prism, an aperture stop surface and a filter surface and a light-receiving surface of an imaging sensor.

R denotes a curvature radius of each surface, and denotes a paraxial curvature radius in an aspheric surface.

D denotes a surface interval, Nd denotes a refractive index of d-line, and νd denotes an Abbe's number. The object distance is infinity. The unit of length is mm.

Example f = 0.75, No = 2.14, ω = 190-degree

| SURFACE NUMBER | R | D | Nd | νd |
|---|---|---|---|---|
| 1 | 17.1 | 1.2 | 1.834807 | 42.725324 |
| 2 | 7.4 | 2.27 | | |
| 3 | −1809 | 0.8 | 1.531131 | 55.753858 |
| 4* | 4.58 | 2 | | |
| 5* | 17.1 | 0.7 | 1.639999 | 60.078127 |
| 6 | 2.5 | 1.6 | | |
| 7 | ∞ | 0.3 | | |
| 8 | ∞ | 5 | 1.834000 | 37.160487 |
| 9 | ∞ | 1.92 | | |
| 10 | ∞(APERTURE STOP) | 0.15 | | |
| 11 | 93.2 | 1.06 | 1.922860 | 18.896912 |
| 12 | −6.56 | 1.0 | | |
| 13 | 3.37 | 1.86 | 1.754998 | 52.321434 |
| 14 | −3 | 0.7 | 1.922860 | 18.896912 |
| 15 | 3 | 0.3 | | |
| 16* | 2.7 | 1.97 | 1.531131 | 55.753858 |
| 17* | −2.19 | 0.8 | | |
| 18 | ∞ | 0.4 | 1.516330 | 64.142022 |
| 19 | ∞ | 0 | | |
| 20 | ∞ | 0.3 | 1.516330 | 64.142022 |
| 21 | ∞ | 0.3 | | |
| 22 | IMAGING SURFACE | | | |

Aspheric Surface

Surfaces having * (both surfaces of second lens in front group and both surfaces of final lens in back group) in the above data are aspheric surfaces.

An aspheric surface shape is expressed by the following known equation by using an inverse of a paraxial curvature radius (paraxial curvature) C, a height from an optical axis H, a conical constant K, and an aspheric surface coefficient of each order with X as the aspheric surface amount in the optical axis direction, and is defined by providing the paraxial curvature radius, conical constant and aspheric surface coefficient.

$$X = CH^2/[1+\sqrt{\{1-(1+K)C^2H^2\}}]+A4 \cdot H^4+A6 \cdot H^6+ A8 \cdot H^8+A10 \cdot H^{10} \cdot A12 \cdot H^{12}+A14 \cdot H^{14}$$

The aspheric surface data of the above example is as follows.

Third Surface
4th: 0.001612
6th: −5.66534e-6
8th: −1.99066e-7
10th: 3.69959e-10
12th: 6.47915e-12
Fourth Surface
4th: −0.00211
6th: 1.66793e-4
8th: 9.34249e-6
10th: −4.44101e-7
12th: −2.96463e-10
Sixteenth Surface
4th: −0.006934
6th: −1.10559e-3
8th: 5.33603e-4
10th: −1.09372e-4
12th: 1.80753−5
14th: −1.52252e-7
Seventeenth Surface
4th: 0.041954
6th: −2.99841e-3
8th: −4.27219e-4
10th: 3.426519e-4
12th: −7.19338e-6
14th: −1.69417e-7

In the above aspheric surfaces, for example, −1.69417e-7 means $-1.69417 \times 10^{-7}$. In addition, $4^{th}$-$14^{th}$ are A4-A14, respectively, In the wide-angle lens of Example, d1=d2=d=6 mm and f=0.75 mm, so that d/f=8, and the above condition (2) is satisfied.

The distance from the most object side lens surface to the reflection surface of the right-angle prism DA and the distance from the reflection surface to t the most image side lens surface DB are as follows.

DA=8.87
DB=14.76

By setting the distance D1 shorter than the distance D2 while ensuring the entire length of the lens required for the performance of the wide-angle lens by the distance DA+DB, the distance between the most object side lens surfaces of the front group is reduced. Thus, an omnidirectional image to a further close distance can be obtained similar to the embodiment illustrated in FIG. 10.

In the imaging system in which the wide-angle lenses of the example are combined as illustrated in FIG. 1, R=11 mm and L=126 mm, compared to R=20 mm and L1=229 mm in the case of using the wide-angle lens in which the optical path is not bent as illustrated in FIG. 9.

In the wide-angle lens over 180-degree angle of view, the optical path lengths of the light beam passing through the center of the lens and the light beam passing through the peripheral portion differ according to a difference between the thicknesses of the lens. The performance may be deteriorated due to such a difference.

In the wide-angle lens of the example, the second lens is likely to have the difference between the thickness near the optical axis thereof and the thickness of the peripheral portion thereof in the three lenses of the front group. Such a difference is corrected by using an aspheric surface on both surfaces of the second lens made of a plastic lens.

By using a plastic lens for the last lens of the back group and an aspheric surface on both surfaces of the plastic lens, aberrations which occur on the object side of this lens can be preferably compensated.

Moreover, by cementing the second biconvex lens and the third biconcave lens of the four lenses of the back group, the chromatic aberration can be preferably compensated.

Figure 2:
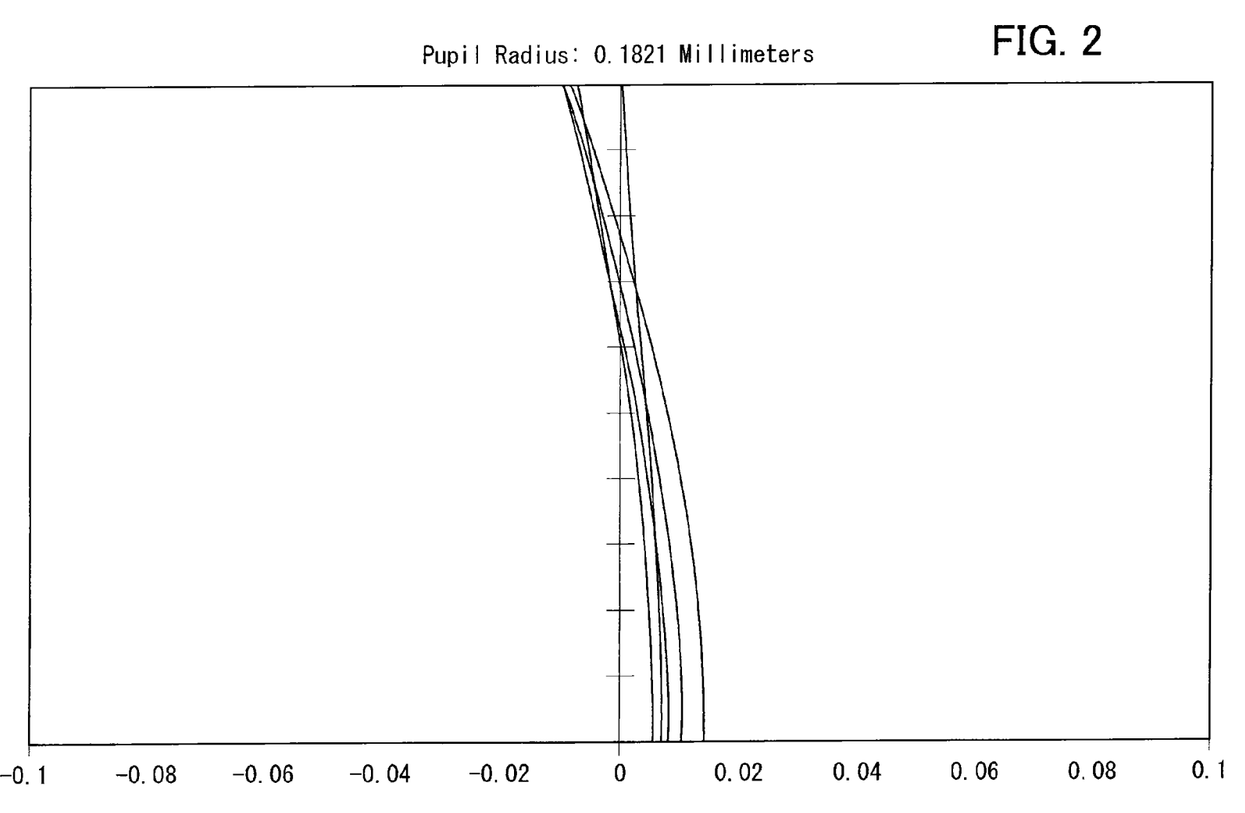
FIG. 2 is a spherical aberration view of a wide-angle lens as an imaging optical system according to an embodiment.
Figure 3:
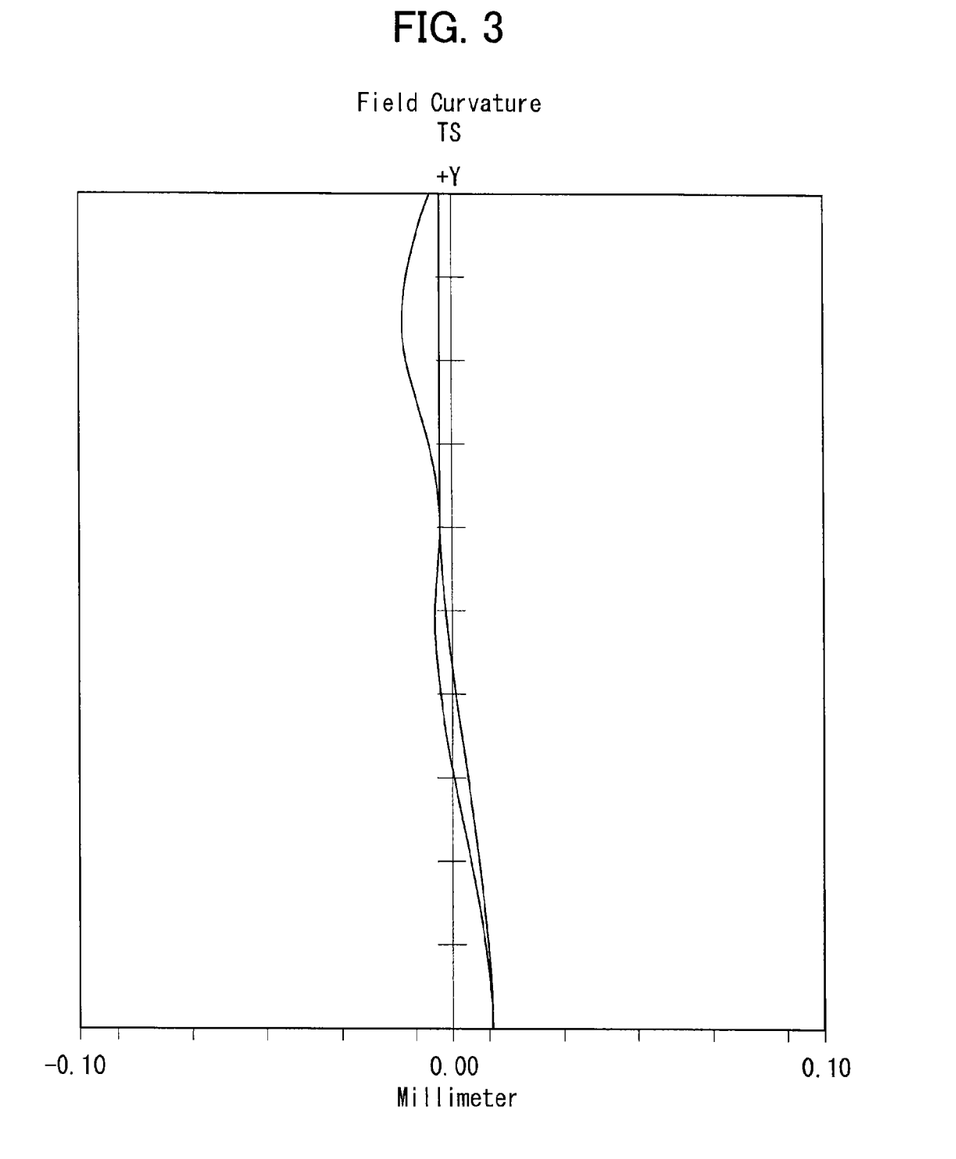
FIG. 3 is a field curvature view of the wide-angle lens according to an example.

FIG. 2 is the spherical aberration view of the wide-angle lens of the embodiment. FIG. 3 is the field curvature view.

Figure 4:
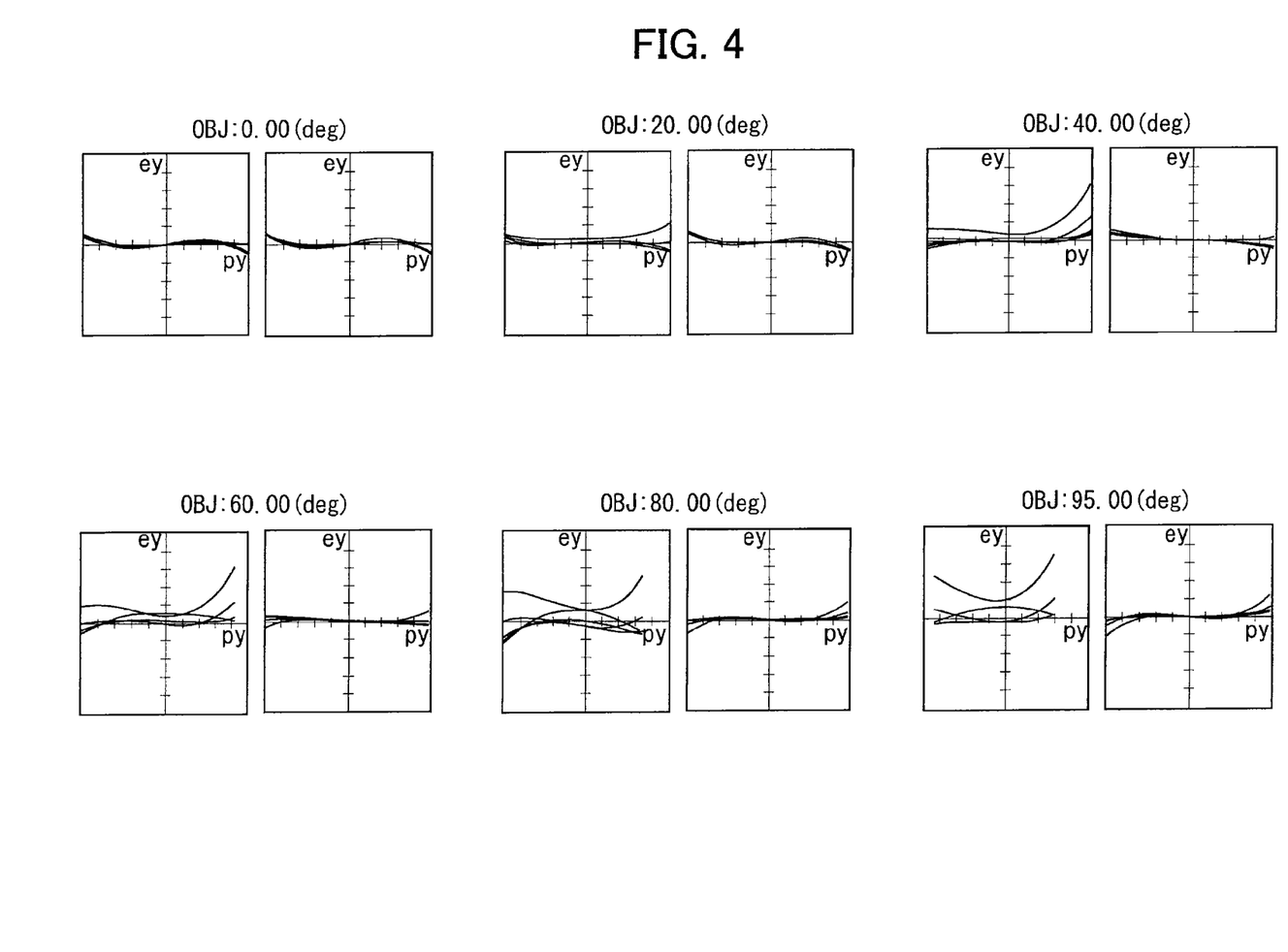
FIG. 4 is a coma aberration view of the wide-angle lens according to the example.

FIG. 4 is the coma aberration view.

Figure 5:
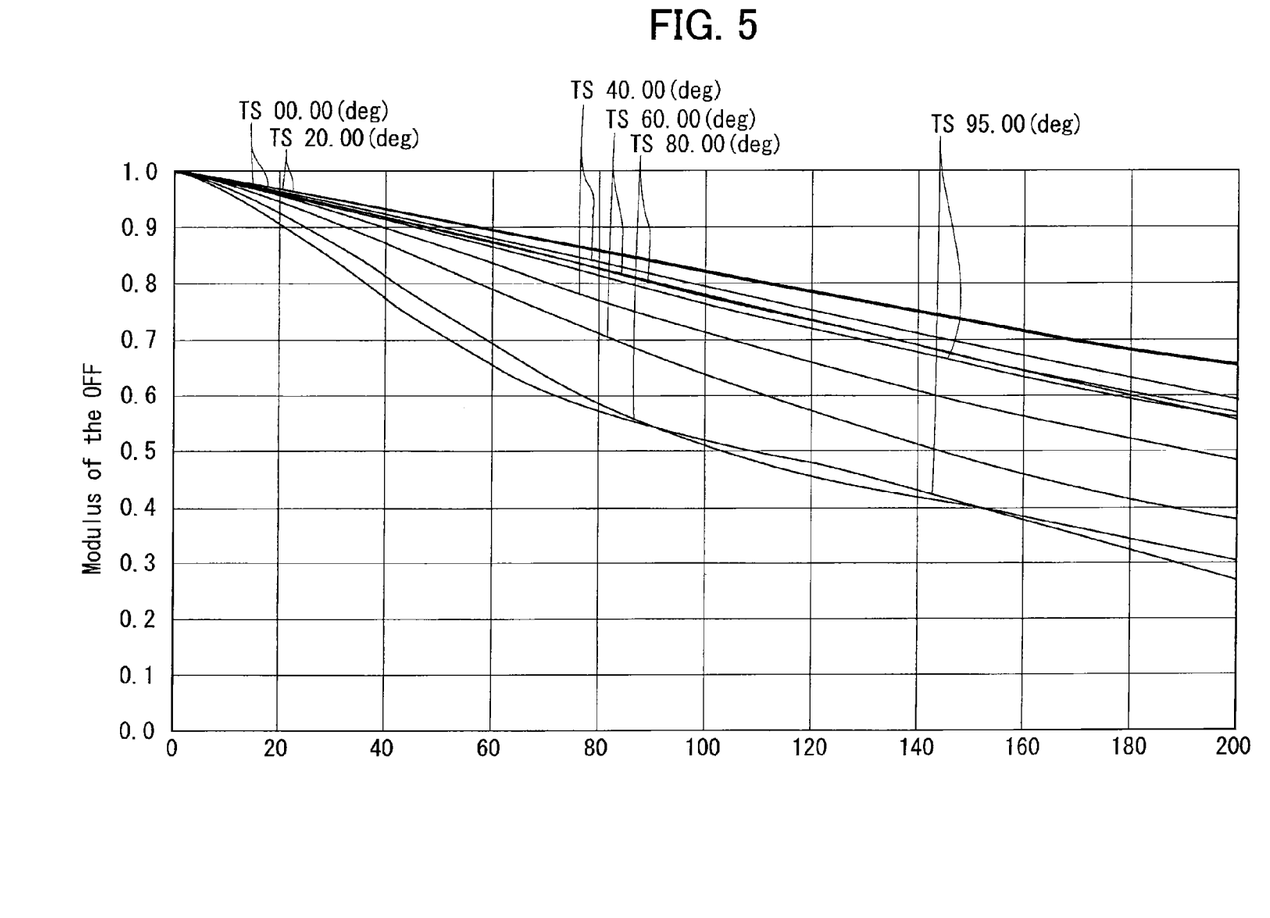
FIG. 5 is an MTF feature view of the wide-angle lens according to the example.
Figure 6:
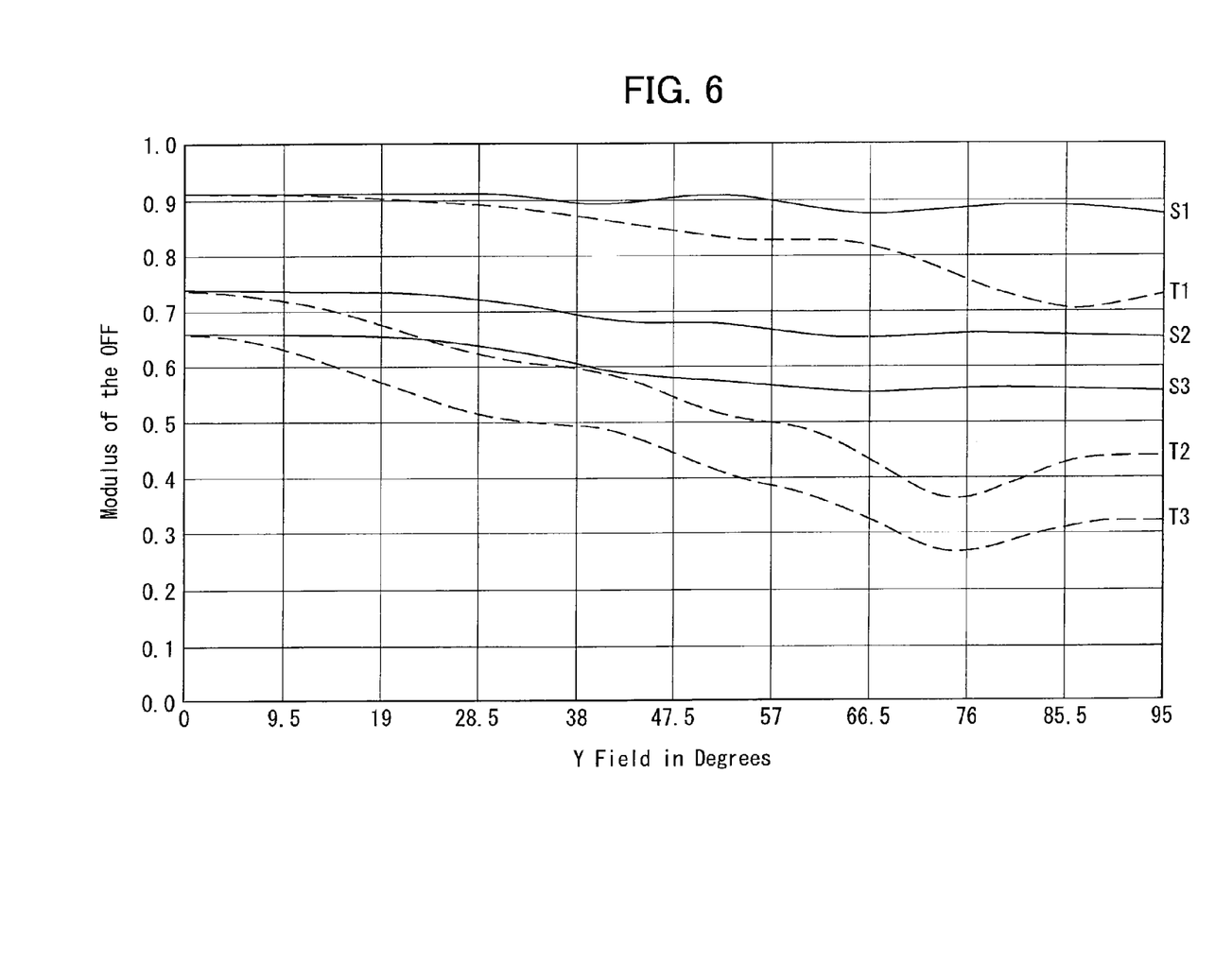
FIG. 6 is an MTF feature view of the wide-angle lens according to the example.

FIGS. 5, 6 are views each illustrating an MTF feature. The horizontal axis is spatial frequency in FIG. 5 and is half angle of view by degree in FIG. 6.

As is apparent from these figures, the wide-angle lens of the example has an extremely high performance.

In the wide-angle lens of the example, the full angle of view is 190 degrees larger than 180 degrees and the magnification per unit angle of view monotonically increases from 0 to 180 degrees.

Figure 7:
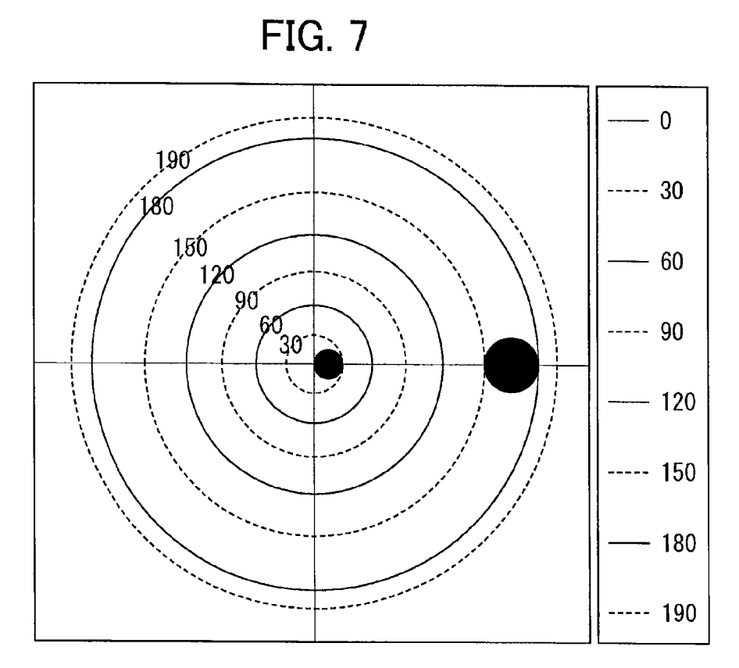
FIG. 7 is a view describing a change in magnification per unit angle of view of the wide-angle lens according to the example.

FIG. 7 is a view describing the broadening of angle of view on the light-receiving surface of the imaging element according to the monotonic increase of the magnification from 0 to 180 degrees.

The same angle of view lines are illustrated at 30 degrees each from 0 to 180 degrees (0 to 90-degree half angle of view). As is known from FIG. 7, the sensor area (width of circle) for use in the imaging element is increased (refer to the size of the black dots in FIG. 8) according to the increase in angle of view. Namely, the magnification per unit angle of view monotonically increases in the range from 0 to 180-degree angle of view.

On the other hand, in the range from 180 to 190-degree angle of view, an image is used as the joint of the images of the two photographing optical systems. For this reason, the width of circle is reduced compared to that in the region of the used sensor near 180-degree angle of view. Namely, the magnification per unit angle of view is reduced in this region.

Figure 8:
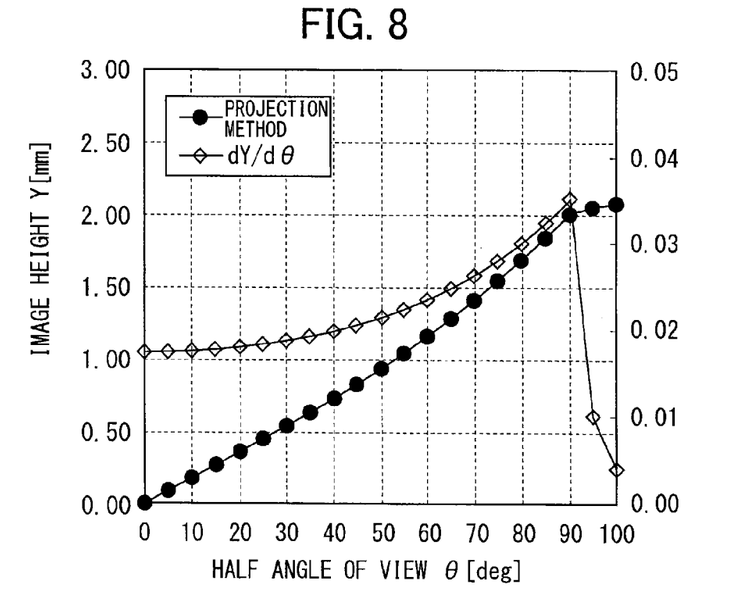
FIG. 8 is a view illustrating the feature of the wide-angle lens according to the example.

FIG. 8 is a graph illustrating a change and a change in $dY/d\theta$ in the magnification per unit angle of view of the wide-angle lens of the example. The magnification per unit angle of view is described as a projection method in FIG. 8.

The horizontal axis illustrates half angle of view (0 to 100 degrees), and the vertical axis illustrates $dY/d\theta$ on the right side and an image height (Y) on the left side.

As is apparent from FIG. 8, in the wide-angle lens of the example, the magnification per unit angle of view monotonically increases from 0 to 180 degrees (360/2), and the increase rate monotonically decreases in 180-degree or more angle of view, which slows the degree of increase, and $dY/d\theta$ satisfies the condition (1).

In the above embodiments, the two imaging optical systems (wide-angle lenses) for use in the omnidirectional imaging system have the same specification, but the imaging optical systems are not limited thereto. Any imaging optical systems can be used as long as their optical features are similar.

Adjacent images are jointed based on the information of the positional relationship of the photographing optical systems in order to synthesize the images by a plurality of imaging elements as one image. However, the images from 180 to 190-degree angle of view can be used as standard data for jointing the images as described above. With this constitution, the images can be accurately jointed even if the relative positional relationship of the two photographing optical systems is changed due to an environmental temperature.

By using the prism as a reflection member as the wide-angle lens according to the embodiment, the reflection member includes a function of a lens, so that the width of the omnidirectional imaging system can be reduced.

As described above, according to the embodiments of the present invention, a new omnidirectional imaging system and imaging optical system can be achieved. In the imaging optical system, the magnification per unit angle of view slowly increases, is constant or monotonically decreases in an angle of view area over 360/n-degree angle of view without monotonically increasing over the full angle of view of the imaging lens. With this constitution, the imaging optical system can be easily designed and manufactured at a low cost while ensuring a thickness required for processing, compared to the case of achieving a solid projection method over a full angle of view. Therefore, an omnidirectional imaging system using such an imaging optical system can be obtained at a low cost.

Although the embodiments of the present invention have been described above, the present invention is not limited thereto. It should be appreciated that variations may be made in the embodiments described by persons skilled in the art without departing from the scope of the present invention.

What is claimed is:

1. An optical system including at least one lens, the optical system comprising:
    a central portion having a magnification per unit angle of view which increases as a distance from a center increases; and
    a circumferential portion being outside the central portion, in which an increase rate of a magnification per unit angle of view decreases as a distance from the central portion increases.

2. The optical system according to claim 1, wherein the optical system comprises a plurality of lenses.

3. The optical system according to claim 1, wherein the circumferential portion is in a range of 0 degree to 360/n degrees where the n is a natural number of 2 or more.

4. The optical system according to claim 3, wherein the natural number n is 2.

5. The optical system according to claim 1, wherein in a region from 0 degree to a full angle of view, an image height Y and an angle of view $\theta$ are set to satisfy the following condition (1):

$$43.3 \geq dY/d\theta \geq 0.007 \text{ [mm/deg]} \quad (1).$$

6. The optical system according to claim 1, wherein the magnification of the central portion monotonically increases.

7. The optical system according to claim 1, wherein the increase rate of the circumferential portion monotonically decreases.

8. An imaging system comprising:
    the optical system according to claim 1; and
    an imaging sensor to photoelectrically convert light focused by the optical system.

9. The imaging system according to claim 8, comprising a plurality of the optical systems.

10. The imaging system according to claim 9, further comprising a plurality of imaging sensors to photoelectrically convert light focused by the plurality of optical systems.

11. The imaging system according to claim 10, wherein images captured by the imaging sensors are combined using an image signal photoelectrically converted from the light from the circumferential portion.

* * * * *